(12) United States Patent
Hauswirth et al.

(10) Patent No.: US 10,118,830 B2
(45) Date of Patent: Nov. 6, 2018

(54) METHOD FOR PRODUCING GRANULAR POLYSILICON

(71) Applicant: Wacker Chemie AG, Munich (DE)

(72) Inventors: Rainer Hauswirth, Kirchdorf (DE); Robert Enggruber, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/109,556

(22) PCT Filed: Dec. 11, 2014

(86) PCT No.: PCT/EP2014/077323
§ 371 (c)(1),
(2) Date: Jul. 1, 2016

(87) PCT Pub. No.: WO2015/104127
PCT Pub. Date: Jul. 16, 2015

(65) Prior Publication Data
US 2016/0326001 A1    Nov. 10, 2016

(30) Foreign Application Priority Data
Jan. 8, 2014 (DE) .................. 10 2014 200 080

(51) Int. Cl.
| B05D 7/00 | (2006.01) |
| C01B 33/03 | (2006.01) |
| B01F 5/24 | (2006.01) |
| B05D 1/22 | (2006.01) |

(52) U.S. Cl.
CPC ............. *C01B 33/03* (2013.01); *B01F 5/247* (2013.01); *B05D 1/22* (2013.01)

(58) Field of Classification Search
CPC ........................................ C01B 33/03
USPC ........................................ 427/213
See application file for complete search history.

(56) References Cited

U.S. PATENT DOCUMENTS

| 3,369,798 A | 2/1968 | Avril |
| 5,791,493 A * | 8/1998 | Meyer ............... B07B 13/11 209/245 |
| 2002/0159329 A1 | 10/2002 | Johanson |
| 2011/0024266 A1 | 2/2011 | Baumann et al. |
| 2013/0295385 A1 * | 11/2013 | Hertlein ............ C01B 33/02 428/402 |

FOREIGN PATENT DOCUMENTS

| CN | 102671582 | 9/2012 |
| EP | 2 662 334 A1 | 11/2013 |
| FR | 448704 A | 2/1913 |

\* cited by examiner

*Primary Examiner* — Tabatha L Penny
(74) *Attorney, Agent, or Firm* — Brooks Kushman P.C.

(57) ABSTRACT

Segregation of silicon granules in the fluidized bed production of polycrystalline silicon is achieved by successively transferring granular polycrystalline silicon through a plurality of vessels designed for funnel flow of granular material. The transfers may occur prior to introduction of feed particles into the reactor, or the enlarged granules from the reactor may be thus transferred to improve product size uniformity.

3 Claims, 3 Drawing Sheets ic industry.
METHOD FOR PRODUCING GRANULAR POLYSILICON

CROSS REFERENCE TO RELATED APPLICATIONS

This application is the U.S. National Phase of PCT Appln. No. PCT/EP2014/077323 filed Dec. 11, 2014, which claims priority to German Application No. 10 2014 200 080.7 filed Jan. 8, 2014, the disclosures of which are incorporated in their entirety by reference herein.

BACKGROUND OF THE INVENTION

1. Field of the Invention

The invention relates to a process for producing granular polysilicon.

2. Description of the Related Art

Polycrystalline silicon, often also called polysilicon for short, is produced, for example, by means of the Siemens process. This involves heating thin filament rods of silicon in a bell jar-shaped reactor ("Siemens reactor") by direct passage of current and introducing a reaction gas comprising a silicon-containing component and hydrogen. The filament rods are typically inserted vertically into electrodes present at the reactor base, through which they are connected to the power supply. Every two filament rods are coupled by means of a horizontal bridge (likewise made from silicon) and form a support body for the silicon deposition. The bridge coupling produces the typical U shape of the support bodies, also called thin rods. High-purity polysilicon is deposited on the heated rods and the bridge, as a result of which the rod diameter grows with time (CVD/gas phase deposition). After the deposition has ended, these polysilicon rods are typically processed further by means of mechanical processing to give chunks of different size classes, classified, optionally subjected to a wet-chemical cleaning operation and finally packed.

An alternative to the Siemens process involves fluidized bed processes in which granular polysilicon is produced. This is accomplished by fluidizing silicon particles by means of a gas flow in a fluidized bed, these being heated to high temperatures by means of a heating apparatus. Addition of a silicon-containing reaction gas results in a pyrolysis reaction at the hot particle surface. This deposits elemental silicon on the silicon particles, and the diameter of the individual particles grows. The regular removal of particles that have grown and addition of smaller silicon particles as seed particles allows the process to be operated continuously with all the associated advantages. Silicon-containing reactant gases that have been described are silicon-halogen compounds (e.g. chlorosilanes or bromosilanes), monosilane ($SiH_4$), and mixtures of these gases with hydrogen.

While the polysilicon in the Siemens process is obtained in the form of a cylindrical silicon rod which has to be comminuted to chunks and possibly cleaned in a time-consuming and costly manner prior to the further processing thereof, granular polysilicon has bulk material properties and can be used directly as a raw material, for example, for single crystal production for the photovoltaics and electronics industry.

In the production of granular polysilicon in a fluidized bed reactor, it is necessary in the course of the process to meter silicon material into the reactor at regular intervals or continuously, and to withdraw ready-grown granular polysilicon from the reactor elsewhere.

US 2011024266 A1 discloses a method for conveying granulated silicon by means of horizontal and/or vertical movement of the conveying device, wherein the conveying device is completely encapsulated with respect to the outside and the forward movement of the granules is produced by a swaying movement of the conveying device by means of the excitation of at least one permanent magnet fitted to the conveying device by an electromagnetic field, wherein the electromagnetic field is applied to the encapsulated device from the outside.

The granular polysilicon has to be handled at various points in the production process. First of all, it has to be withdrawn from the reactor. The method described above is suitable for that purpose. Subsequently, it may have to be screened in order to separate it into different classes of particle sizes. For this purpose, it is transported by means of a transport container to the screening facility. Finally, the granules have to be packed. For this purpose too, it is customary to transport the granules by means of a container to the packing facility. Alternatively, the target material from the screening facility can also be collected in a stationary vessel. The vessel is connected directly to the packing facility.

As mentioned above, the granular polysilicon has bulk material properties. Therefore, experience from general bulk material technology is transferable to the granular polysilicon.

A problem in the handling of bulk materials is particle segregation.

Segregation by particle size arises when a central cone of bulk material forms in the middle in the course of filling of a vessel (or of a container or a silo). In the course of filling, the larger particles, because of their greater mass and hence higher kinetic energy, roll into the periphery (in the vessel wall direction), while the fine material accumulates principally in the center. The effect of such segregation over the cross section is that product streams with different particle size distribution are discharged successively as the material runs out.

If no measure is taken to counter particle segregation, an inhomogeneous production batch with respect to particle size is obtained in the production of bulk silicon materials in which the product is stored in vessels.

For many semiconductor and photovoltaics applications, however, maximum homogeneity of the particle size of the silicon raw material is required to assure stable processes.

Bulk material is generally stored in containers or silos. If bulk material flows out of a silo, a distinction is made between mass flow and funnel flow.

In the case of mass flow, the entire contents of the silo are in motion when bulk material is drawn off. Mass flow is only possible when the vessel walls are sufficiently steep and/or smooth. Moreover, what is called plug flow has to be achieved at the same time, in which all vertical silo cross sections also flow at the same speed. The main method of achieving this is a suitable design of the angle of funnel inclination.

Although it is extremely difficult, optimal dimensioning alone can achieve the desired backmixing.

One alternative is internal funnels, called binserts. They are smaller than the actual funnel and are placed in front of it. However, the use thereof is limited and the design thereof for use in the case of segregation is difficult.

If the funnel wall is too flat or too rough, funnel flow is established. In the case of funnel flow, at first only the bulk material in the region above the outflow orifice is in motion. Bulk material in the edge region of the silo is not discharged until the silo has been emptied completely. In the course of emptying, the bulk material in the center of the silo—i.e. the fines—is the first to be drawn off, while predominantly coarse material is discharged toward the end of the emptying. In the case of downstream packing of the bulk material, this would lead to different qualities in the individual packing units.

In a mass flow silo, in contrast, the bulk material which has been segregated in the course of filling merges in again, such that there is no trace of the segregation at the outflow orifice. Mass flow silos typically comprise conical or wedge-shaped funnels.

There have also been suggestions of counteracting particle segregation by moving the mixing vessel. However, the great technical complexity and high wall abrasion are disadvantageous. For granular polysilicon in particular, this approach is unusable since the wall abrasion leads to unwanted contamination of the high-purity silicon. Moreover, the movement of the bulk material can result in a post-comminution effect which gives rise, for example, to dust.

By altering the filling operation, it is possible to minimize segregation. It is possible to avoid large cones of bulk material by filling via several introduction points. This makes the situation somewhat less serious, but does not entirely prevent segregation. The complex filling system required additionally constitutes a contamination risk in the production of high-purity bulk Si materials.

Another possible approach to a solution is a discharge aid such as a controllable inner cone. The inner cone is mounted in the lower region of the vessel. This forms an annular gap between the cone and vessel wall, which simultaneously supplies the coarse material from the edge region and the fine material from the center of the vessel to the outlet, so as to result in a certain degree of backmixing.

A further measure for influencing the emptying operation involves what are called emptying tubes, which are equipped with gaps or holes. However, backmixing is only possible when emptying is sufficiently slow.

Usually, transport containers are used in the production of granular polysilicon to transport material from one manufacturing operation to the next.

The prior art has to date not offered any promising solutions for avoiding particle segregation in the handling of granular polysilicon. Transport containers with mass flow are impracticable since very high construction heights are required because of the steep angle of funnel inclination necessary. Since the center of gravity is then very high up, there is a risk that the transport container will tip over.

SUMMARY OF THE INVENTION

These problems gave rise to the objective of the invention. These and other objects are achieved by a process for producing granular polysilicon in a fluidized bed reactor, comprising fluidization of silicon particles by means of a gas flow in a fluidized bed which is heated to a temperature of 850-1100° C. by means of a heating apparatus, addition of a silicon-containing reaction gas and deposition of silicon on the silicon particles, withdrawal of the granular polysilicon produced from the reactor and packing of the granular polysilicon, wherein the granular polysilicon is transferred by means of vessels designed for funnel flow on more than one occasion from the withdrawal of the granular polysilicon from the reactor up to the packing of the granular polysilicon.

DETAILED DESCRIPTION OF THE PREFERRED EMBODIMENTS

Figure 1:
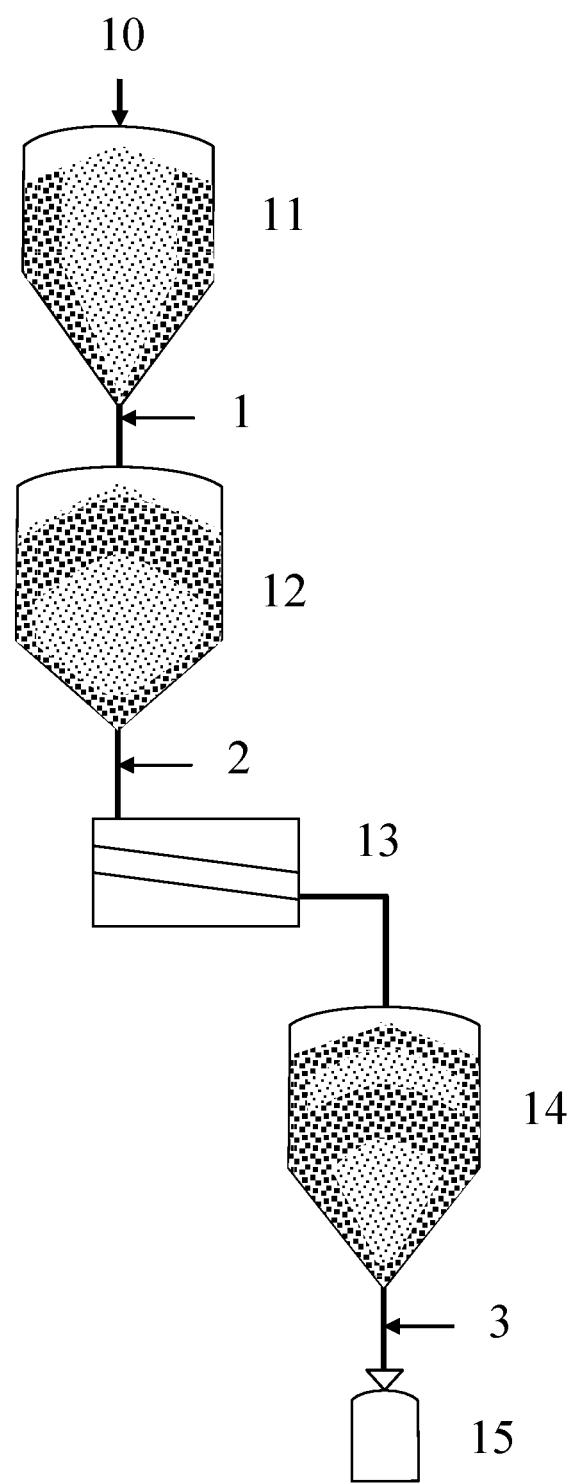
FIG. 1 shows, in schematic form, the transfer operations from the withdrawal of the granular polysilicon from the reactor up to the packing thereof.
Figure 2:
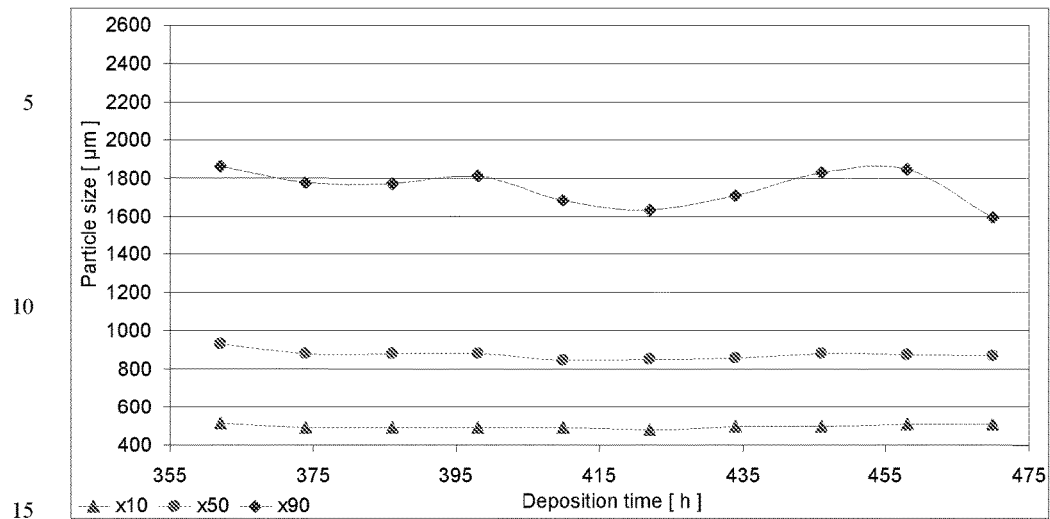
FIG. 2 shows the particle size of the granules as a function of transfer volume before the first transfer.

The invention envisages that the bulk Si material is transferred on more than one occasion. It is preferably transferred on at least three occasions.

The vessels used are designed for funnel flow. This is understood to mean that, in the course of emptying, the granular polysilicon in the center of the vessel—i.e. the fines—is the first to be drawn off, while predominantly coarse material is discharged toward the end of the emptying. As a result, in contrast to transport containers with mass flow, it is possible to avoid wall abrasion and hence contamination of the granular polysilicon.

After a particular number of transfer operations, it is surprising that only slight particle segregation is observed over the production batch.

A further reduction in particle segregation is preferably accomplished by means of filling distributor cones which are installed in the inlet of the vessels. Such internals are designed to give very low contamination, preferably in silicon.

It has been found that, surprisingly, significant segregation is present after the first filling, as described in the prior art. However, if the bulk material is transferred on further occasions, backmixing takes place, so as to result in homogenization of the particle size distribution after a particular number of transfer steps. The result is a granular polysilicon having a homogeneous particle size distribution over the entire production batch, with a deviation in the median particle size of an arbitrary sample from the batch of not more than 30% from the mean particle size of the entire batch.

If required, for a further reduction in particle segregation, filling distributor cones are installed in one or more vessels. These internals are designed to give very low contamination, and are preferably made of silicon.

Preference is also given to the use of alternative internals such as emptying funnels, emptying tubes and binserts in order to further minimize segregation by backmixing.

The internals are manufactured from low-contamination materials such as silicon or are lined or coated with these materials.

The number of transfer operations in which maximum homogeneity of backmixing of the batch is established depends on the particle size distribution of the bulk material and the outflow characteristics of the vessel. The optimal number of transfer steps is determined empirically.

The best way of empirically determining the transfer steps is by means of a test setup composed of two transport containers arranged one on top of the other. The containers are connected by means of a container emptying and filling station and a pipeline. Additionally installed in the pipeline is a sampling station which enables representative sampling.

Before the first transfer step, the upper container is filled with a test material having a homogeneous particle size.

During the transfer operation, samples are taken at regular intervals for the determination of the particle size. With the aid of the results of the particle size measurements, particle segregation is determined.

The containers are exchanged before the next experiment: the full container is connected to the emptying station and the empty container to the filling station. Particle segregation is restarted.

The experiments are repeated until there is maximum homogeneity of particle size over the entire batch.

If required, the incorporation of a cone-shaped distributor into the vessels can reduce segregation further. In order that the high-purity Si product is not contaminated by these internals, the invention solves this problem with a very low-contamination design, preferably made from silicon. The incorporation of such a distributor reduces the formation of a large cone of bulk material and hence the segregation potential.

Alternatively, the distributor cone can also be formed from the product itself, in that the formation of a cone of bulk material is enabled on a platform beneath the entry stub.

Preferably, the silicon particles on which silicon is deposited in order to produce granular polysilicon are also transferred by means of vessels designed for funnel flow on more than one occasion between the production of the silicon particles by grinding and supply of the silicon particles to the reactor. These silicon particles too, i.e. the seed particles in the deposition process, have bulk material properties. For the process for producing granular polysilicon, it is advantageous when the seed particles have a homogeneous particle size distribution.

Such a process for producing polycrystalline silicon granules in a fluidized bed reactor, comprising fluidization of silicon seed particles by means of a gas flow in a fluidized bed which is heated by means of a heating apparatus, with deposition of elemental silicon at the hot seed particle surfaces by means of pyrolysis through addition of a silicon-containing reaction gas, which gives rise to the polycrystalline silicon granules, can be operated continuously by removing particles that have grown in diameter as a result of deposition from the reactor and metering in fresh seed particles.

The temperature of the fluidized bed in the reaction region is preferably from 850° C. to 1100° C., more preferably from 900° C. to 1050° C., most preferably from 920° C. to 970° C.

For the fluidization of the seed particles, preference is given to using hydrogen.

The reaction gas is injected into the fluidized bed by means of one or more nozzles.

The local gas velocities at the exit of the nozzles are preferably 0.5 to 200 m/s.

The concentration of the silicon-containing reaction gas, based on the total gas volume flowing through the fluidized bed, is preferably 10 mol % to 50 mol %, more preferably 15 mol % to 40 mol %.

The concentration of the silicon-containing reaction gas in the reaction gas nozzles is, based on the total gas volume flowing through the reaction gas nozzles, preferably 20 mol % to 80 mol %, more preferably 30 mol % to 60 mol %. The silicon-containing reaction gas used is preferably trichlorosilane.

The reactor pressure varies within the range from 0 to 7 bar gauge, preferably within the range of 0.5 to 4.5 bar gauge.

In the case of a reactor having a diameter of, for example, 400 mm, the mass flow rate of trichlorosilane is preferably 200 to 400 kg/h.

The volume flow rate of hydrogen is preferably 100 to 300 $m^3$ (STP)/h.

For larger reactors, higher amounts of TCS and $H_2$ are preferred.

The person skilled in the art will appreciate that some process parameters are ideally selected as a function of the reactor size. The reactor heating output, seed particle metering rate and bed weight are preferably higher than the aforementioned values in the case of larger reactors, for example in the case of a reactor of diameter 800 mm.

In order to illustrate this, there follows a summary of the ranges of the operating data normalized to the cross-sectional reactor area in which the process described in the context of this invention is viable.

The specific mass flow rate of trichlorosilane is preferably 1600-5500 kg/(h*m2).

The specific volume flow rate of hydrogen is preferably 800-4000 $m^3$ (STP)/(h*$m^2$).

The specific bed weight is preferably 800-2000 kg/$m^2$.

The specific metering rate of seed particles is preferably 8-25 kg/(h*$m^2$).

The specific reactor heating output is preferably 800-3000 kW/$m^2$.

The mean diameter of the silicon particles (seed particles) is preferably at least 400 μm.

The granular polysilicon preferably has particle sizes of 150-10,000 μm, where a mass-based median particle size distribution is 850-2000 μm.

The residence time of the reaction gas in the fluidized bed is preferably 0.1 to 10 s, more preferably 0.2 to 5 s.

EXAMPLE

In the example, three transfer operations were conducted.

FIG. 1 shows that the granules are withdrawn from the reactor 10 and transferred into a buffer vessel 11. They are then transferred into a transport container 12 and transported to the screening facility 13. They are then transferred again into a buffer vessel 14 and finally packed 15.

The transfer from buffer vessel 11 to transport container 12 corresponds to the first transfer 1.

The transfer from transport container to buffer vessel (via a screening facility) corresponds to the second transfer 2.

The transfer from buffer vessel to the packing facility corresponds to the third transfer 3.

FIGS. 2-5 show the particle segregation at the start (first buffer vessel after withdrawal from the reactor, FIG. 2) and after each of the three transfer operations.

The segregation is illustrated using the plot of the particle parameters x10, x50 (median) and x90 as a function of the amount of bulk Si material drawn off.

On the basis of the results found, the layers of coarse material (shaded with large symbols) and fine material (shaded with small symbols) are shown in FIG. 1.

Figure 3:
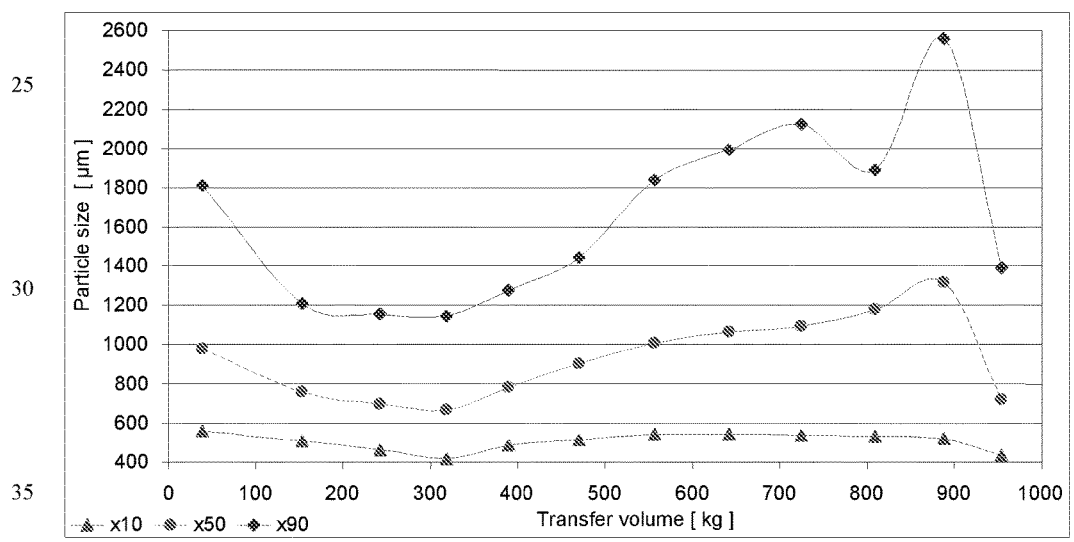
FIG. 3 shows the particle size of the granules as a function of transfer volume after the first transfer.

After the first transfer 1, significant particle segregation is present; see FIG. 3. The plot of the median (x50) begins at 980 μm. Up to a discharged amount of 320 kg, the value falls to 670 μm. Thereafter, the value rises to 1300 μm up to about 880 kg of the amount drawn off, before declining to about 720 μm at a further 60 kg.

Figure 4:
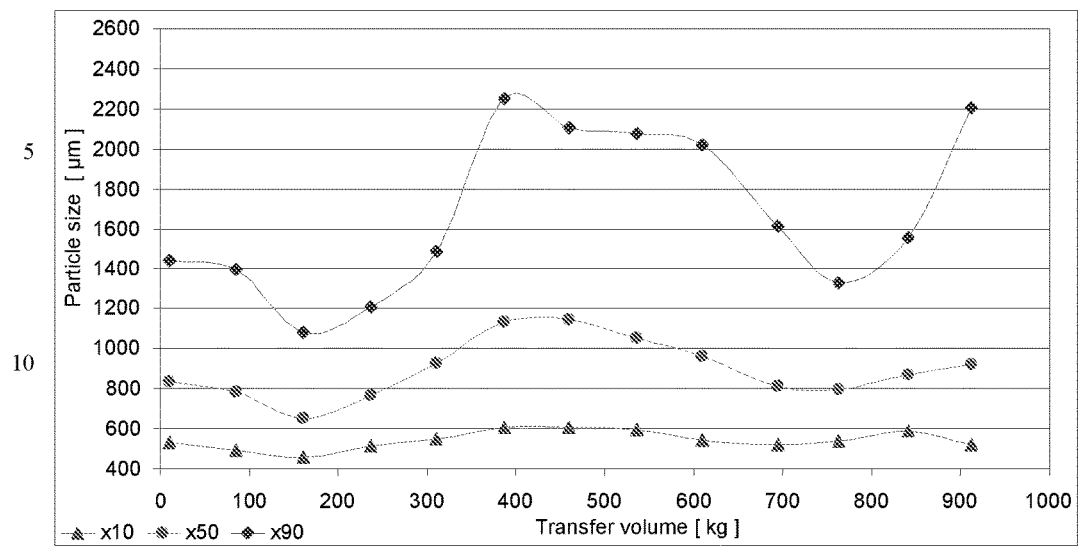
FIG. 4 shows the particle size of the granules as a function of transfer volume after the second transfer.

After the second transfer 2, particle segregation is already less marked; see FIG. 4. The median falls from initially almost 840 to 650 μm after about 160 kg of the amount has been drawn off. Within the 300 kg which then follow, the median rises again very significantly to more than 1100 μm. From 460 kg, the median decreases to about 790 μm. In the remaining 150 kg, the median rises once again to more than 920 μm.

Figure 5:
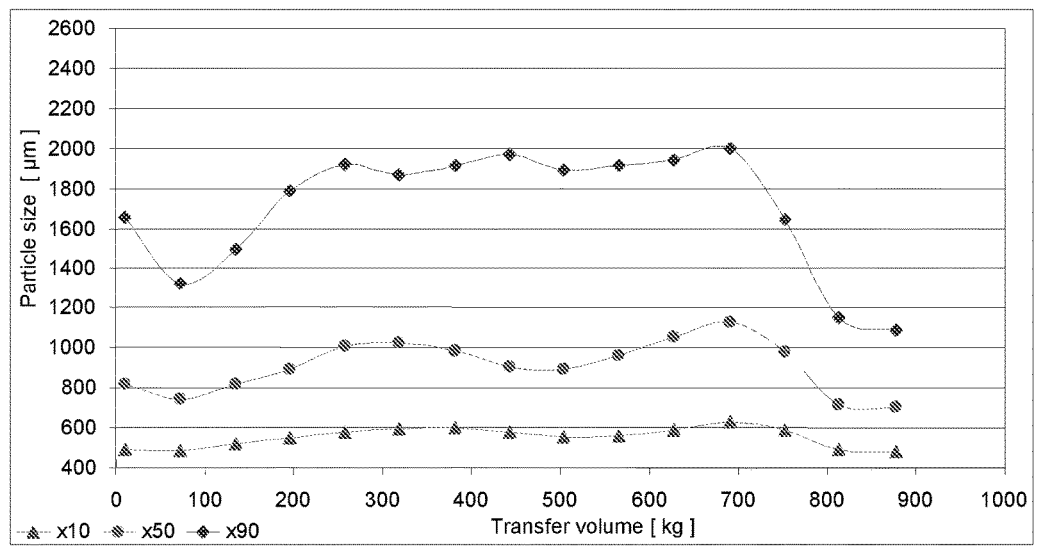
FIG. 5 shows the particle size of the granules as a function of transfer volume after the third transfer.

After the third transfer 3, a relatively homogeneous particle distribution over the entire batch is present; see FIG. 5. After 100 kg, the median declines only slightly from 820 to 740 μm, after which there is a rise in the 220 kg which follow to about 1000 μm. By 500 kg, the value drops to 900 μm and, by 700 kg, rises to more than 1100 μm. In the remaining volume of Si, it decreases again and reaches a value of about 700 μm.

Through the funnel flow in the vessels, in which the material in the center of the vessel is the first to flow out, the upper coarse layer comes in about the middle of the transfer operation out of the vessel. Since the coarse and fine particles mix again, there is apparently partial backmixing of the production batch.

The invention claimed is:

1. A process for avoiding particle segregation by size in the handling of granular polysilicon after production of the granular polysilicon by a process comprising: fluidizing silicon particles by means of a gas flow in a fluidized bed which is heated to a temperature of 850-1100° C. by means of a heating apparatus, adding a silicon-containing reaction gas and depositing silicon on the silicon particles, and withdrawing granular polysilicon from the fluidized bed reactor, and before packing the granular polysilicon, transferring the granular polysilicon by means of a plurality of successive conical vessels designed for funnel flow, and wherein at least one of the plurality of vessels comprises filling distributor cones consisting of silicon of coated or lined with silicon, installed in at least one of the plurality of vessels.

2. The process of claim 1, wherein at least one of the plurality of vessels comprise an emptying funnel, an emptying tube or a binsert, each of which consists of silicon or is coated or lined with silicon.

3. The process of claim 1, wherein the silicon particles on which silicon is deposited in order to produce granular polysilicon are produced by grinding silicon and classifying by screening, wherein the silicon particles are transferred by means of a plurality of successive vessels designed for funnel flow between production of the silicon particles and supply of the silicon particles in the reactor.

* * * * *